Patented Mar. 4, 1924.

1,485,794

UNITED STATES PATENT OFFICE.

PHILIP ALEXANDER MACKAY, OF LONDON, ENGLAND.

PROCESS FOR MAKING LEAD SULPHATE.

No Drawing.  Application filed September 28, 1920. Serial No. 413,418.

*To all whom it may concern:*

Be it known that PHILIP ALEXANDER MACKAY, a citizen of the United States of America, residing at London, England, has invented an Improved Process for Making Lead Sulphate, of which the following is a specification.

This invention relates to an improved process for making lead sulphate direct from metallic lead.

In the manufacture of lead sulphate it is known that when metallic lead is heated with strong sulphuric acid to some 260° centigrade it is suddenly converted into sulphate of lead. This temperature, however, is so high that much of the acid would have volatilized before the temperature was reached which is very wasteful of acid, and it would be difficult to obtain materials of construction which will stand the high temperature mentioned without rapid deterioration.

The object of this invention is to obviate these difficulties and to obtain lead pigment by a process involving comparatively low temperatures only.

In the course of experiment I have found that lead may be dissolved with oleum at a comparatively low temperature, and this invention consists in the use of oleum for the very rapid solution of commercial lead at a temperature of not more than about 150° centigrade. If started at this temperature after the reaction has started it may in many cases proceed without the application of further heat until all the lead has been converted into sulphate, or at any rate it can proceed at a reduced temperature, say, at about 100° centigrade. Further, by the treatment of the lead with oleum in the presence of a more electro-negative element than lead, such, for example, as mercury, copper, or silver, it is found that the lead will go into solution at even lower temperatures, i. e., between 95° to 100° centigrade, and with a most violent exothermic reaction.

Metals of the character of mercury, copper or silver, are employed in this treatment, although it is understood that other elements which are electro-negative to lead can be employed.

In carrying out this process, therefore, it is preferable that the metallic lead is first treated by covering it with a slight coating of a more electro-negative element, which may advantageously be done by treating the cast lead with a solution of sulphate of mercury, or copper sulphate, after which the lead is treated by dissolving it in oleum at a temperature of about 90° centigrade, the oleum being preferably in excess so that the reaction may be quicker, since the presence of the excess oleum prevents the mass getting too thick and thereby retarding the reaction.

Having started the reaction by providing the external temperature of 90° centigrade I have found that it may proceed without the application of any other heat until all the lead has been converted into lead sulphate forming the lead pigment which is required, and after the start of the reaction no further external heat need be applied; the exothermic heat is more than sufficient to complete the reaction. In addition, therefore, to the saving of acid by the use of a low temperature only, when the lead is amalgamated on the surface with mercury, or in contact with mercury, copper, or silver, it is also possible easily to find materials of construction in which the process can take place, for instance, it may be carried out in a porcelain vessel, and in the case of the treatment with a more electro-negative element the application of heat needs only to be for a short time.

When carrying my invention into practice, I prefer to treat commercial lead with one-and-a-half to two parts of its weight of oleum, and after the completion of its reaction the oleum is diluted to precipitate the lead sulphate and then excess oleum recovered comparatively pure as a weaker acid.

Before submitting the lead to the action of oleum I coat the lead with an element electro-negative to it, or alternatively I introduce the latter into the oleum during the reaction, either in the form of a metal or its chlorides, sulphates or nitrates.

An additional advantage of this process is that when the lead contains bismuth or silver the oleum forms a solvent for the bismuth or silver which are in solution after the lead sulphate has been precipitated, and may be recovered by any suitable known process, thus a considerable further saving is achieved.

I claim—

1. Method of manufacturing lead sulphate from metallic lead, wherein the metallic lead is subjected to the action of oleum until all the metallic lead is converted into sulphate.

2. Method of manufacturing lead sulphate from metallic lead, wherein the metallic lead is subjected to the action of oleum at a temperature not exceeding 150° centigrade, and the reaction maintained at a temperature of about 100° centigrade until all the metallic lead is converted into sulphate.

3. Method of manufacturing lead sulphate from metallic lead, wherein the metallic lead is subjected to the action of oleum in the presence of a metal electro-negative to lead, until all the metallic lead is converted into sulphate.

4. Method of manufacturing lead sulphate from metallic lead, wherein the metallic lead is subjected to the action of oleum at a temperature between 95° to 100° centigrade in the presence of a metallic element electro-negative to lead, until all the metallic lead is converted into sulphate.

5. Method of manufacturing lead sulphate from metallic lead, wherein the metallic lead is coated with a metallic element electro-negative to lead, and then subjected to the action of oleum until all the metallic lead in converted into sulphate.

6. Method of manufacturing lead sulphate from metallic lead, wherein the metallic lead is coated with a metallic seating electro-negative to lead, and then subjected to the action of oleum at a temperature between 95° and 100° centigrade until all the metallic lead is converted into sulphate.

7. Method of manufacturing lead sulphate from metallic lead, wherein, the metallic lead is treated with a solution of a salt of a metallic element electro-negative to lead, and capable of forming a coating, and then subjected to the action of oleum until all the metallic lead is converted into sulphate.

8. Method of manufacturing lead sulphate from metallic lead, wherein the metallic lead is treated with a solution of a salt of a metallic element electro-negative to lead, and capable of forming a coating, and then subjected to the action of oleum at a temperature between 95° and 100° centigrade until all the metallic lead is converted into sulphate.

9. A method of manufacturing lead sulphate from metallic lead, wherein the metallic lead is subjected to the action of oleum in excess of the amount of oleum necessary to dissolve the metallic lead whereby the required temperature is obtained by exothermic reaction.

10. A method of manufacturing lead sulphate from metallic lead, wherein the metallic lead is subjected to the action of oleum in excess of the amount of oleum necessary to dissolve the metallic lead in the presence of a metal electro-negative to lead whereby the required temperature is obtained by exothermic reaction.

11. A method of manufacturing lead sulphate from metallic lead, wherein the metallic lead is coated with a metallic element electro-negative to lead and then subjected to the action of oleum in excess of the oleum required to dissolve the metallic lead whereby the required temperature is obtained by exothermic reaction.

12. Method of manufacturing lead sulphate from metallic lead, wherein the metallic lead is treated with a solution of a salt of a metallic element electro-negative to lead, and capable of forming a coating, and then subjected to the action of oleum in excess of the oleum required to dissolve the metallic lead whereby the required temperature is obtained by exothermic reaction.

13. Method of manufacturing lead sulphate from metallic lead at a temperature of about 90° centigrade, wherein the state of the metallic lead is changed by utilizing exothermic reaction obtained by subjecting the metallic lead to the action of oleum in excess of the oleum required to dissolve the metallic lead and in the presence of a metal electro-negative to lead, all as set forth.

In testimony whereof I affix my signature.

PHILIP ALEXANDER MACKAY.

Witness:

LEWIS B. B. SPARKS.